March 2, 1954     H. S. PARROTT     2,670,994
DEMOUNTABLE SAFETY WHEEL
Filed Feb. 23, 1951

HAROLD S. PARROTT
*INVENTOR*

BY *[signature]*

*ATTORNEY*

Patented Mar. 2, 1954

2,670,994

UNITED STATES PATENT OFFICE 2,670,994

DEMOUNTABLE SAFETY WHEEL

Harold S. Parrott, Big Spring, Tex.

Application February 23, 1951, Serial No. 212,260

1 Claim. (Cl. 301—39)

This invention relates to auxiliary safety wheels for use in conjunction with wheels on which pneumatic tires are mounted.

The purpose of auxiliary safety wheels of the described class is to lessen the danger resulting from punctures and blow-outs in vehicles equipped with pneumatic tires. Generally, the safety wheels referred to are comprisesd of disklike members having diameters greater than the vehicle wheels on which they are mounted, but less than the outside diameters of the pneumatic tires. Each such auxiliary wheel is concentric with the axis of the vehicle wheel on which it is mounted and is spaced from the side wall of the tire. Should the tire become punctured or otherwise deflated while the vehicle is traveling at a high rate of speed, the rim of the auxiliary wheel will contact the roadway and provide for bringing the vehicle to a stop under the control of the driver.

Heretofore it was necessary to support the vehicle wheel by means of a jack or the like when mounting or removing auxiliary wheels. An object of the present invention is to provide means whereby an auxiliary wheel may be conveniently mounted on or removed from a vehicle wheel, using the inflated tire as a supporting means.

Another object is to provide attaching means whereby the auxiliary wheel is well secured and steadied relative to the vehicle wheel.

Another object of the invention is to provide a lightweight auxiliary wheel which will permit changing the tire without having to remove vehicle wheel.

Another object of the invention is to provide means whereby an auxiliary wheel may conveniently be mounted on either the outside or the inside of the vehicle wheel.

These and other objects will become apparent from the following description and accompanying drawings.

Figures 1, 2:
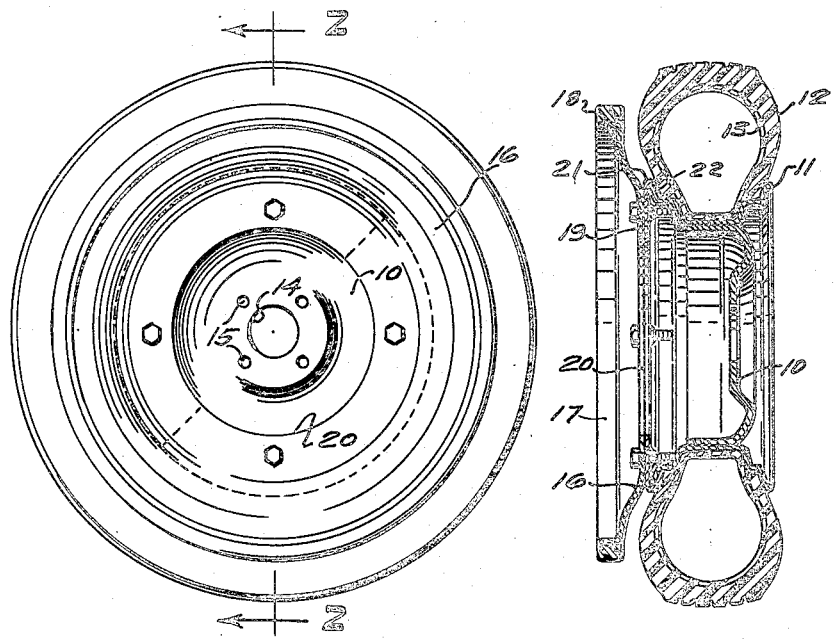
Figure 1 is an elevational view of a vehicle wheel showing an auxiliary wheel mounted thereon by means of the present invention.
Figure 2 is a sectional view taken on line 2—2 of Figure 1.

In the drawings the numeral 10 designates a conventional vehicle wheel, such as used on a passenger bus, truck or automobile, and has a flanged rim 11 secured therearound for holding a pneumatic tire 12 and tube 13 in the usual manner. The wheel 10 includes a central opening 14 to accommodate the end of a spindle or axle, not shown, and is provided with smaller openings 15 therearound to receive the studs projecting from the brake drum, not shown.

The present invention is directed to means for securing an auxiliary wheel 16 in spaced relation with respect to and concentric with one side of the tire 12, and the diameter of which auxiliary wheel is less than the outside diameter of said tire, but greater than the outside diameter of the wheel rim 11. The periphery of the auxiliary wheel is flanged, as at 17, and has a solid rubber tire 18 mounted therearound and secured thereon by means of annular grooves in the outer surface of said flange. It will be noted that the flange 17 is offset with respect to the plane of the body 19 of the wheel 16, and that a relatively large central opening 20 is provided in said body to accommodate the vehicle axle, spindle or brake drum, as the case may be.

Figure 4:
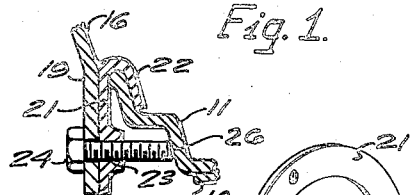
Figure 4 is an enlarged sectional view showing the manner whereby the inner ends of the bolts are employed for steadying the auxiliary wheel relative to the vehicle wheel.

The auxiliary wheel 16 may be attached to either side of the vehicle wheel 10 by means of arcuate members 21 having reverse bent flanges 22 therearound, the latter being shaped to conform with and fit against the inner surface of the outer portion of the wheel rim 11, as best illustrated in Figure 4. Preferably, the arcuate members 21 are in the form of half circles, but may be divided into as many arcuate members as desired. Each arcuate member 21 is threaded, as at 23, to receive bolts 24 positioned through openings 25 in the body of the auxiliary wheel 16. The openings 25, last referred to, are equally spaced with respect to each other so as not to interfere with the balance of the assembly. As particularly shown in Figure 4, the end 26 of the bolt 24 bears against the side of the rim 11 so as to steady the auxiliary wheel 16 in its described position.

Figures 3, 5:
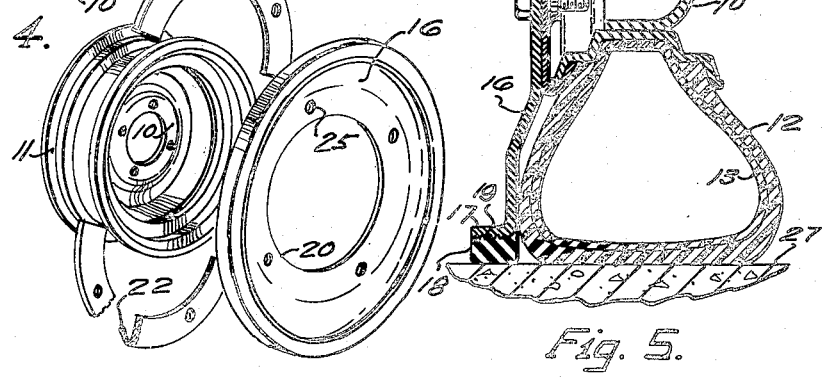
Figure 3 is an exploded perspective view of the vehicle wheel, auxiliary wheel, and attaching members illustrated in Figures 1 and 2.
Figure 5 is a sectional view similar to the lower portion of Figure 2, but showing the tire deflated and the rim of the auxiliary wheel in contact with the surface of the roadway.

In operation, the auxiliary wheel 16 is attached to the rim 11 of the wheel 10 by placing the same on the desired side of the latter, and the arcuate members 21 are engaged on the outer flange of the rim 11. The bolts 24 are then inserted through the openings 25 in the auxiliary wheel 16 and engaged in the threads 23 in the arcuate members 21. The ends 26 of the bolts 24 are brought into contact with the side of the rim 11 so as to attain the above referred to steadying effect of the auxiliary wheel 16 on the vehicle wheel 10. By reversing the last referred to order of operations, the auxiliary wheel may be conveniently and easily removed when the tire 12 is inflated. When the tire 12 is punctured or otherwise deflated, the auxiliary wheel 16 supports the vehicle by contacting the surface of the roadway 27, as shown in Figure 5.

The described form of the invention is not limited to the construction herein shown and described, but may be made in many ways within the scope of the appended claim.

What is claimed is:

An auxiliary wheel assembly adapted to be secured to the tire flange of a vehicle wheel having a pneumatic tire mounted thereon, said auxiliary wheel assembly comprising a circular body having the center portion in a single plane and the periphery thereof flanged and offset with respect to said center portion so as to provide an auxiliary wheel rim, the periphery of said auxiliary wheel being greater than the periphery of said tire rim but less than the periphery of said pneumatic tire mounted thereon, arcuate members having reverse bent flanges along their outer edges adapted to engage said tire flange of said wheel, said arcuate members being arranged adjacent to each other and substantially engaging the circumference of said tire flange, said arcuate members including tapped holes therethrough inwardly of their reverse bent flanges, said auxiliary wheel including round openings therethrough, and bolts received through the last said openings and threadedly received through said tapped holes.

HAROLD S. PARROTT.

References Cited in the file of this patent

UNITED STATES PATENTS

| Number | Name | Date |
| --- | --- | --- |
| 1,424,314 | Marien | Aug. 1, 1922 |
| 1,799,567 | Pruden | Apr. 7, 1931 |
| 1,918,694 | Gerben | July 18, 1933 |

FOREIGN PATENTS

| Number | Country | Date |
| --- | --- | --- |
| 541,731 | France | of 1922 |
| 954,917 | France | June 20, 1949 |